United States Patent

Boliver

[15] 3,678,432
[45] July 18, 1972

[54] VENTED FUSE MODULE FOR UNDERGROUND POWER CABLE SYSTEM

[72] Inventor: Vincent J. Boliver, Pittsfield, Mass.
[73] Assignee: General Electric Company
[22] Filed: April 26, 1971
[21] Appl. No.: 137,441

[52] U.S. Cl. ............................337/201, 174/73 R, 337/203, 339/117 R
[51] Int. Cl. ................H01h 85/02, H01h 85/54, H01r 13/52
[58] Field of Search ................174/73 R; 337/201, 203, 205, 337/249, 250, 272, 281; 339/111, 112 R, 117 R, 117 P

[56] References Cited

UNITED STATES PATENTS

| | | | |
|---|---|---|---|
| 3,513,425 | 5/1970 | Arndt | 337/201 |
| 3,451,025 | 6/1969 | Jacks et al. | 337/249 |
| 1,874,948 | 8/1932 | Fogal | 337/250 |
| 3,323,097 | 5/1967 | Tordoff | 174/73 R X |
| 3,307,137 | 2/1967 | Tordoff | 174/73 R X |
| 2,785,319 | 3/1957 | Simpson et al. | 337/205 X |

Primary Examiner—Bernard A. Gilheany
Assistant Examiner—Dewitt M. Morgan
Attorney—Vale P. Myles, Francis X. Doyle, Frank L. Neuhauser, Oscar B. Waddell and Joseph B. Forman

[57] ABSTRACT

A multi-part, separable fuse module having a relatively flexible pair of overlapping surfaces that afford a water-tight seal between the parts of the module is provided with gas-venting passage-ways through predetermined portions of these overlapping surfaces in order to enable high pressure gases to temporarily open the passageways and escape from the interior of the module, without allowing water to enter the module. In combination with the fuse module, the invention comprises a rigid clamping member mounted over the relatively separable parts of the module to maintain them in fixed relationship during a gas-venting operation.

6 Claims, 3 Drawing Figures

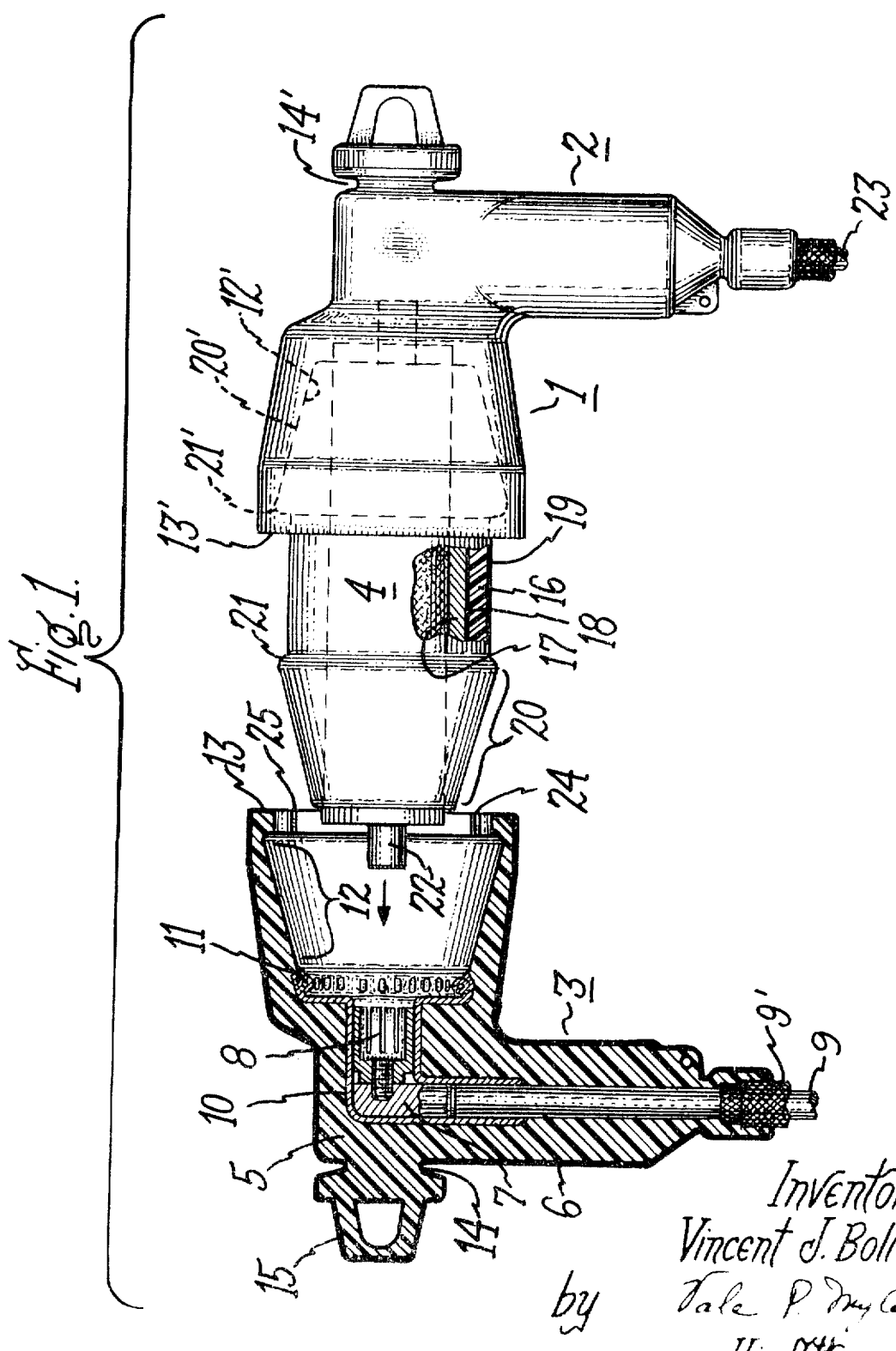

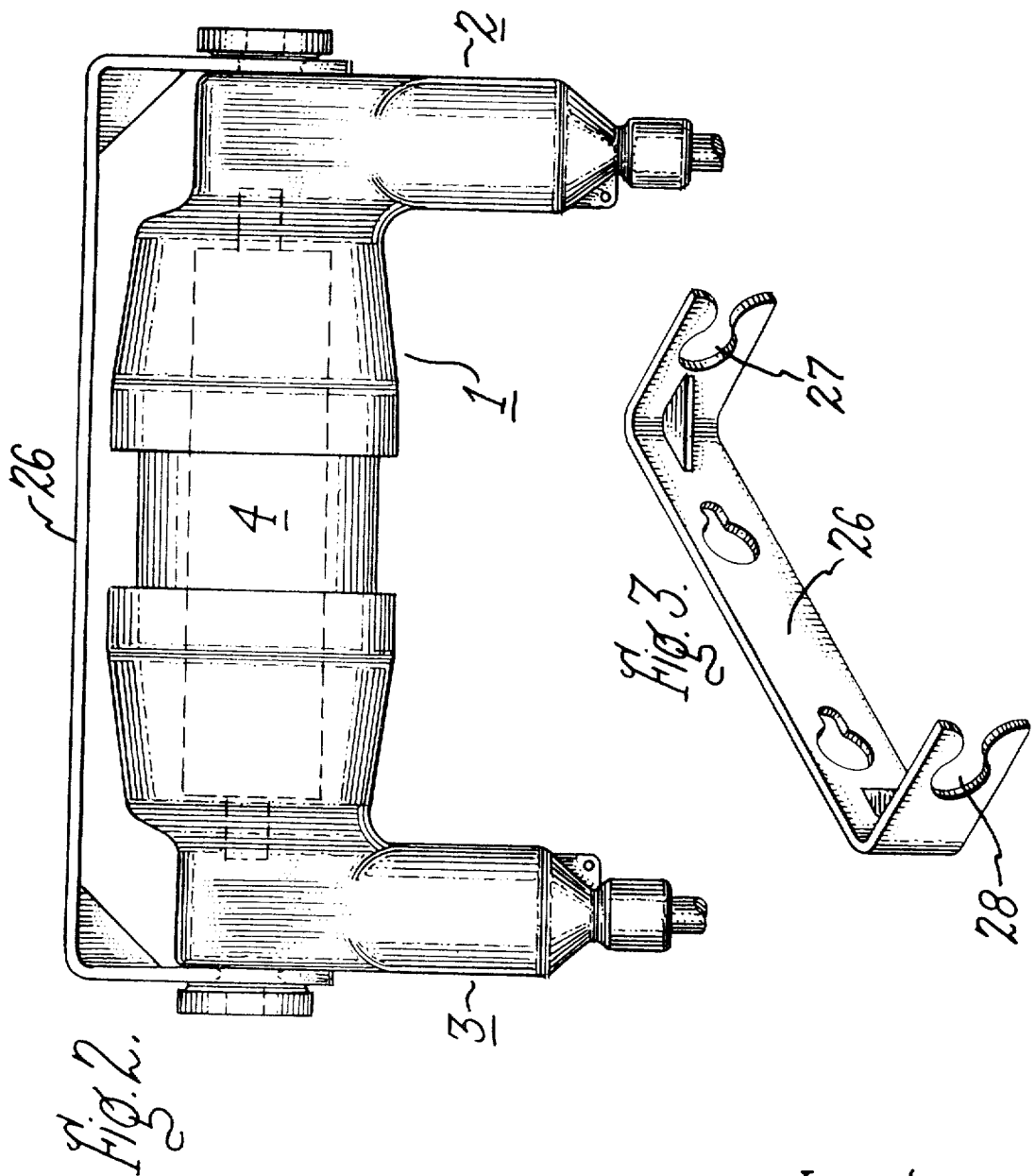

VENTED FUSE MODULE FOR UNDERGROUND POWER CABLE SYSTEM

BACKGROUND OF THE INVENTION

The invention is related to underground power distribution systems, and more particularly to a fuse module for use on such systems. The fuse module of the invention incorporates means that are operable to vent high pressure gases therefrom, without destroying the water-tight integrity of the module.

Prior to the present invention, it was well known in the field of underground electric power distribution to utilize molded, modular-type electric cable terminations to inter-connect, or terminate, the conductors of the system. Moreover, suitable modules have already been manufactured for mounting system components, such as current limiting fuses, in operating relationship with the power conductors of such systems. An example of such prior art underground fuse modules is disclosed in U.S. Pat. No. 3,513,425-Arndt, which issued May 19, 1970 and is assigned to the assignee of the present invention.

It has been found that such prior art types of underground fuse modules are completely satisfactory for normal use with cartridge type fuses of a kind that do not evolve substantial amounts of gas during a circuit interrupting operation. However, when fuses utilizing gas-evolving, arc-extinguishing materials are utilized in such prior art fused modules, there is a substantial degree of risk that a fuse circuit interrupting operation will result in the fuse module being forced to separate or open. Of course, such a separation could cause the power system to be grounded if the module happens to be submerged in water, which would rush into contact with the energized power cable terminated within the module. Accordingly, since gas-evolving power fuses will probably be used on many of the high current power distribution lines being placed in use, it is desireable to provide a suitable means for assuring that such fuses can be safely used in underground distribution system fuse modules.

One solution proposed for the foregoing problem required the use of a separable fuse module in which the power cable termination contacts would be mounted in bell-shaped cavities. In placing such a module in operation on an underground power system, care would be taken to mount the module in a vertical position such that the element of the module containing a contact that terminates the hot side of the system would be in an inverted position. Consequently, if the fuse module became separated during a fuse interrupting operation, the inverted cavity would act like a diver's bell to prevent water from contacting the energized side of the power system. While such a fuse module design is theoretically possible, it has been found to have many practical drawbacks in actual field application. Perhaps the most severe of these drawbacks is that a short circuit to ground might still occur on a high voltage distribution system due to current arcing-over the air gap between the energized terminal and the water level allowed to develop within the fuse module when the fuse fails.

OBJECTS OF THE INVENTION

A primary object of the present invention is to provide an underground power distribution system fuse module, which overcomes the disadvantages and shortcomings of prior art fuse modules noted above.

Another object of the invention is to provide a fuse module having gas venting means that enable gas to be rapidly and automatically vented from the module in response to high gas pressures being developed within it. Such gas venting occurs without allowing water to enter the fuse module.

A further objective of the invention is to provide a multi-part fuse module in combination with clamping means for preventing axial separation of component parts of the module during a gas venting operation.

A still further object of the invention is to provide a multi-part fuse module having a pair of relatively movable, molded elastomeric housing components that are adapted to separate in response to the development of high gas pressure within the module, thereby to serve as a clapper-type valve that exhausts gas from the module without allowing water to enter it.

Additional objects and advantages of the invention will become apparent to those skilled in the art from the disclosure that follows, taken in conjunction with the accompanying drawings.

SUMMARY OF THE INVENTION

A multi-part, molded, elastomeric fuse module for an underground electric power distribution system is provided with venting means for exhausting high pressure gases from the module without allowing water to enter it. The separate parts of the module are mounted in operating position in a manner such that at least a portion of their respective juxtaposed end surfaces overlap in water-tight sealing relationship. One or more gas venting passageways are formed through a predetermined portion of the overlapping end of the surfaces. The passageway or passageways are operable to vent gases from the interior of the module without allowing water into the module, due to the sealing relationship that is maintained between its respective parts during a gas venting operation. In one embodiment of the invention, maintenance of this sealing relationship is assured by the provision of a clamping member, in combination with the fuse module, to prevent relative movement in an axial direction between the parts of the fuse module. In addition, the innermost of the overlapping module surfaces is made relatively rigid with respect to the outer surface, therefore, when high pressure gases are developed within the module the outer surface is temporarily expanded radially away from the inner surface to afford a clapper valve type of operation between the two surfaces. This valve action allows gases to be vented from the fuse module through the aforementioned passageways.

BRIEF DESCRIPTION OF THE DRAWINGS

FIG. 1 is a side elevation view, partly in cross section, of an underground electric power fuse module constructed pursuant to the teaching of the present invention, and shown with some of its components in a partly separated position.

FIG. 2 is a side elevation view of the fuse module illustrated in FIG. 1, showing the component parts of the fuse module in assembled position, and illustrating a clamping member in combination with the fuse module pursuant to a teaching of the present invention.

FIG. 3 is a perspective view of the clamping member illustrated in FIG. 2 of the drawing.

DESCRIPTION OF SOME PREFERRED EMBODIMENTS OF THE INVENTION

Referring now to FIG. 1 of the drawing, it will be seen that there is shown a three-part fuse module that is adapted for use with a high voltage electric power distribution system. The fuse module 1 comprises a first conductor combination module 2, a second conductor termination module 3, and a fuse shielding module 4. The first and second conductor modules, 2 and 3, are substantially identical in construction; therefore, in order to explain the present invention only the module 3 will be described in detail herein. All of the modules 2–4 are forms of molded, resilient, insulating material that may be a suitable, conventional elastomeric compound similar to that referred to in the above-mentioned Arndt patent, or any other suitable, relatively flexible insulating material. As shown in the cross section view of module 3 the major portion thereof comprises a body of insulating material 5. A coating 6 of electrically conductive, sulphur-cured elastomeric material is bonded to the outer surface of the module 3 by being sprayed, or dipped-formed thereon. Mounted within the module 3 is an electrical contact member 7 formed of aluminum. A fluted angular contact 8 is screwed into the contact member 7 to be retained in position, as shown.

It will be understood that during normal assembly, the contact 7 is crimped onto the conductor of insulated electric power cable. The cable 9 and contact member 7 are then forced into an axial passageway in the module 3 to the position shown in FIG. 1. Next, the fluted terminal 8 is screwed into the member 7 to form the assembly as shown. In order to shield the irregular surfaces of this combination contact assembly, a molded layer of conductive elastomeric material 10 is bonded to the inner surface of the body of insulating material 5 of module 3, as shown. It will be noted that one end of the conductive sleeve 10 terminates in an annular metal spring 11 that is mounted near the small diameter end of a frustoconical surface 12, that extends from the spring 11 to an annular lip portion 13 adjacent its large diameter end. As shown in FIG. 1, the lip portion 13 protrudes inwardly from the large diameter end of the frusto-conical surface 12 and it forms a relatively sharp angle (slightly less than 90°) with that surface, to afford a latching function that will be explained hereinafter.

The module 3 also includes an integral boss 14 on which there is mounted a ring 15, or other loop configuration, that is adapted to receive a manually operated hot stick with which the module 3 can be manipulated when the electric power system on which it is mounted is de-energized.

Fuse shielding module 4 comprises a relatively rigid wall member 17 on which a layer of electrically semi-conductive material 18 is applied. Over the material 18, a layer of elastomeric dielectric material 16 is molded. In order to provide a continuous ground coating for the multi-part module 1, the outer surface of fuse shielding module 4 is coated with an electrically conductive elastomeric coating 19 that extends along its general cylindrical central portion. Both ends of fuse shielding module 4 are substantially identical in shape and are formed as frusto-conical end surfaces 20,20'. As shown in FIG. 1 these frusto-conical end surfaces 20,20' terminate in generally annular ridge portions 21,21'. In other embodiments of the invention the fuse module (4) may be formed of relatively rigid insulating material, so that a wall member, such as member 17 is not required. Of course, in such an embodiment, a semiconductive layer (18) and a conductive coating 19 should still be utilized. It will be understood that the generally annular ridge portion 21,21' are latched in position with respect to termination modules 2 and 3 by their engagement with the lips 13 and 13' when the modules 2, 3 and 4 are assembled in operating position. Also, it will be understood that a cartridge type fuse, one terminal 22 of which is shown in FIG. 1, is normally mounted within the module 1 when it is thus assembled in operating position in a power distribution system, thereby to complete a conductive circuit between the power conductor 9 and a second conductor 23 that is mounted in module 2. The features of fuse module 1, as described thus far, are generally known in the art, and they have been substantially described in the above identified Arndt patent. The characteristic features of the invention disclosed and claimed herein, as embodied in the structure illustrated in FIG. 1, comprise gas venting means for releasing gas under pressure from the interior of the fuse module 1. In this embodiment of the invention, the gas venting means are in the form of a plurality of passageways defined through the annular lip portions 13, 13' of the conductor termination module 2 and 3. Two of these passageways, 24 and 25, are shown in the lip portion 13 of module 3, at equally-spaced-apart points thereon. It will be understood that two additional passageways (not shown) are also positioned in the other half of the module 3 so that there are a total of four equally-spaced-apart passageways around the periphery of the annularly shaped lip portion 13. In like manner, a number of passageways are formed in the lip portion 13' of conductor termination module 2, although these passageways are not visible in FIG. 1. It should be understood that in some applications a single gas-venting passageway will be suitable to afford the objectives of the invention; however, for present day power distribution systems it has been found that a plurality of passageways (24, 25, etc.) spaced at equally separated distances around the periphery of the lip portions 13 and 13' are preferable. Moreover, it has been found that these passageways should each have a width of at least one-sixteenth of an inch over their entire length. This width affords ample venting capability for the type of gas evolving fuses currently in use.

In the operation of this form of the invention when gas is released under pressure within the fuse module 1, the rigid wall member 17 of fuse shielding module 4 prevents its frusto-conical surface 20 from being distorted radially outward. On the other hand, the gas pressure is operative to force the frusto-conical surface 12 of conductor termination module 3 outward, thereby to make it operate as a clapper-type valve to temporarily lift the lip portion 13 radially outward with respect to the annular ridge 21, so that gas is vented through the passageways (24 and 25). In the preferred form of the invention, the passageways (24 and 25) are generally triangular in cross section. This configuration of these passageways allows a progressively greater exposure to the outer atmosphere as the lip portion 13 moves radially outward, so that more gas can be vented in proportion to such outward movement.

In many field applications, the latching effect between lip portions 13 and 13' and ridge portions 21 and 21' is sufficient to prevent the separate component modules of fuse module 1 from being separated during a gas-venting operation. However, it has been found that for other, higher interrupting current applications, additional means must be provided to assure the water-tight integrity of the seal formed between the frusto-conical surfaces (12 and 20) during a gas-venting operation. One embodiment of such an arrangement will now be described in detail with reference to FIG. 2 of the drawing.

There is shown in FIG. 2, a fuse module 1 that is identical to the fuse module 1 that is illustrated in FIG. 1. Accordingly, like reference numerals are used in FIG. 2 to designate similar component parts. The fuse module 1 is shown with cable termination modules 2 and 3 mounted in assembled, operating position on cable shielding module 4. In this embodiment of the invention a relatively rigid clamping member 26 is removably mounted over the outside of the first termination module 2 and the second termination module 3. The clamping member 26 is generally U-shaped and is formed of stainless steel bar stock approximately three-sixteenths of an inch thick and 2¼ inches wide. As seen more clearly in FIG. 3, the clamping member 26 includes means defining a pair of generally U-shaped slots, 27 and 28, in each of its opposite ends. The U-shaped slots 27 and 28 are adapted to cooperate, respectively, with the boss elements 14 and 14' of the first and second termination modules 3 and 2. Specifically, the U-shaped slots 27 and 28 serve to maintain the clamping member 26 mounted in operating position, as shown in FIG. 2, over the respective bosses 14, 14' on said modules 2 and 3.

In operation, the embodiment of the invention depicted in FIG. 2 functions generally in the same manner as the embodiment of the invention illustrated in FIG. 1 but, in addition, the clamping member 26 is operable to prevent relative movement between the modules 2–4 in an axial direction. Thus, clamping member 26 assures maintenance of a water-tight sealing relationship between the respective abutting frusto-conical surfaces 12–20 and 12'–20' on the ends of fuse shielding module 4 and modules 2 and 3.

From the foregoing description of the invention it will be apparent to those skilled in the art that various modifications and alternative embodiments of it may be used to afford the unique advantages inherent in its teaching. For example, it will be apparent that the invention will perform equally well on a two-part fuse module. In order to briefly explain such an application, reference is again made to FIG. 1 of the drawing. It should be obvious that, if desired, the modules 2 and 4 could be molded together as a single first conductor termination module (2–4) which would have a generally frusto-conical end surface (20), which still be adapted to cooperate with the frusto-conical (12) of a second module 3, to form a water-tight seal around the fuse-holding cavity formed in the module (2–4), as described above. In other respects, the construction of such a more generally unitary fuse module 1 could be similar to the embodiment of the invention described above, initially, with reference to FIG. 1. Also, a clamping member, such as the clamping member 26, could be used to hold a two-part fuse module in operating water-tight relationship as explained above with reference to the embodiment of the invention depicted in FIG. 2.

What I claim as new and desire to secure by Letters Patent of the United States is:

1. A three-part fuse module for high voltage electric power conductors comprising; first and second conductor termination modules and a fuse shielding module, said first and second modules being formed of molded, resilient insulating material and having respectively, generally frusto-conical end surfaces that form water-tight, voltage grading seals with opposed, generally frusto-conical end surfaces of said fuse shielding module, when coupled in operating position therewith, each of said first and second modules having an annular lip portion protruding inwardly from the larger diameter section of their respective end surfaces, said shielding module having a pair of generally annular ridge portions that respectively engage said annular lip portions, thereby to latch said modules together, and gas venting means for releasing gas under pressure from the interior of said fuse module, said gas venting means being disposed adjacent said lip portions and being operable to prevent water from entering the fuse module while gas is vented therefrom, and said gas venting means being formed to define a plurality of spaced-apart passageways through the annular lip portion of at least one of said conductor termination modules.

2. The invention defined in claim 1 wherein each of said modules is formed of molded resilient insulating material, said fuse shielding module including a relatively rigid wall member that is effective to prevent the generally annular ridge portions thereof from being forced radially outward when gas pressure is developed within the fuse module by failure of a gas-generating fuse mounted therein, whereby such gas pressure is effective to temporarily separate the water-tight seals between said modules due to the outward radial movement of the frusto-conical surfaces of said first and second modules responsive to gas pressure, thereby to vent gas through said passageways.

3. The invention defined in claim 1 wherein said first and second termination modules are formed of resilient insulating material, and said fuse module is formed of a rigid insulating material, whereby gas pressure developed by a fuse failure is effective to temporarily separate the water-tight seals between said modules due to the outward radial movement of the frusto-conical surfaces of said first and second modules responsive to gas pressure, thereby to vent gas through said passageways.

4. The invention defined in claim 1 including a relatively rigid clamping member removably mounted over the outside of said first and second conductor termination modules, said clamping member being operable to prevent relative movement between said modules in an axial direction while being freely movable with said modules as an assembly, thereby assuring maintenance of a water-tight sealing relationship between the first and second modules and said fuse shielding module during a gas venting operation even when said modules are moved from a fixed position during such an operation.

5. The invention defined in claim 4 wherein said clamping member is generally U-shaped in configuration and includes means defining a generally U-shaped slot in each end thereof, said U-shaped slots being adapted to cooperate, respectively, with boss elements on said first and second modules, thereby to maintain the clamping member in operating position with respect to said modules.

6. A three-part fuse fuse module for high voltage electric power conductors comprising; first and second conductor termination modules and a fuse shielding module, said first and second modules being formed of molded, resilient insulating material and having respectively, generally frusto-conical end surfaces that form water-tight, voltage grading seals with opposed, generally frusto-conical end surfaces of said fuse shielding module, when coupled in operating position therewith, each of said first and second modules having an annular lip portion protruding inwardly from the larger diameter section of their respective end surfaces, said shielding module having a pair of generally annular ridge portions that respectively engage said annular lip portions, thereby to latch said modules together, and gas venting means for releasing gas under pressure from the interior of said fuse module, said gas venting means being disposed adjacent said lip portions and being operable to prevent water from entering the fuse module while gas is vented therefrom, and including four equally spaced-apart passageways formed in each of said annular lip portions, each of said passageways being at least one-sixteenth inch wide over its entire length.

* * * * *